Nov. 30, 1937.

J. U. FISH 2,100,474

COMBINED AIR CONDITIONING AND HOUSE HEATING SYSTEM

Filed Oct. 4, 1935

Witness:
Harry R. L. White.

Inventor:
John Underhill Fish.
By Kummler, Kummler & Woodworth, Atty's

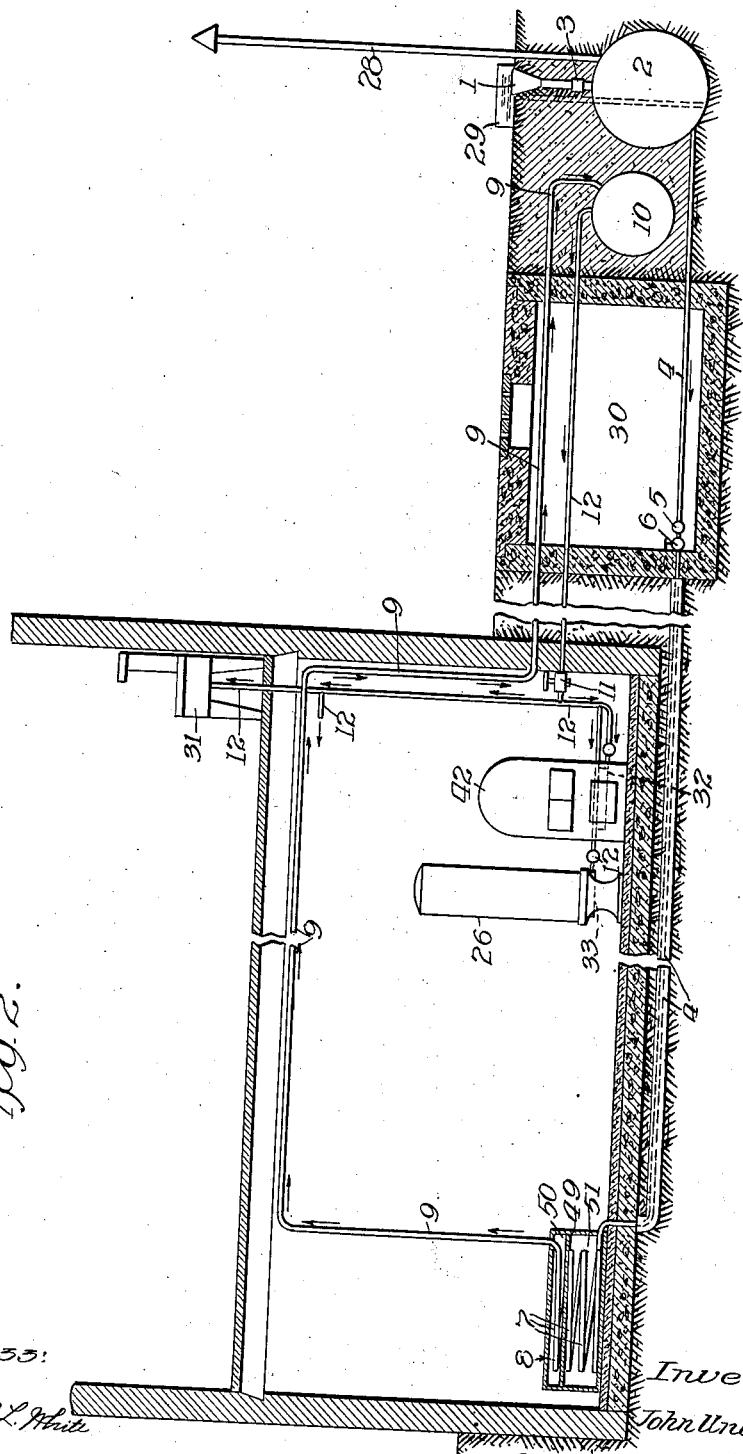

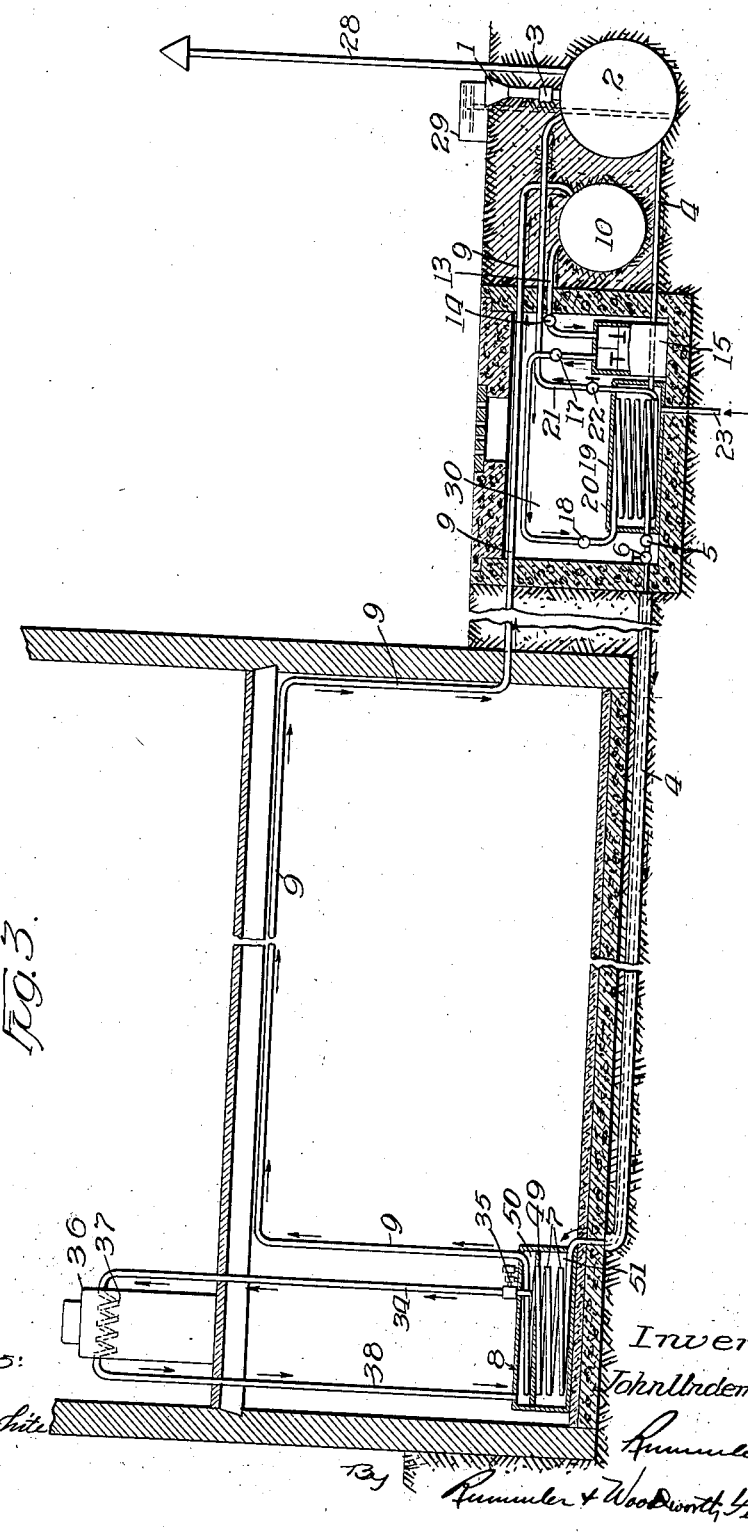

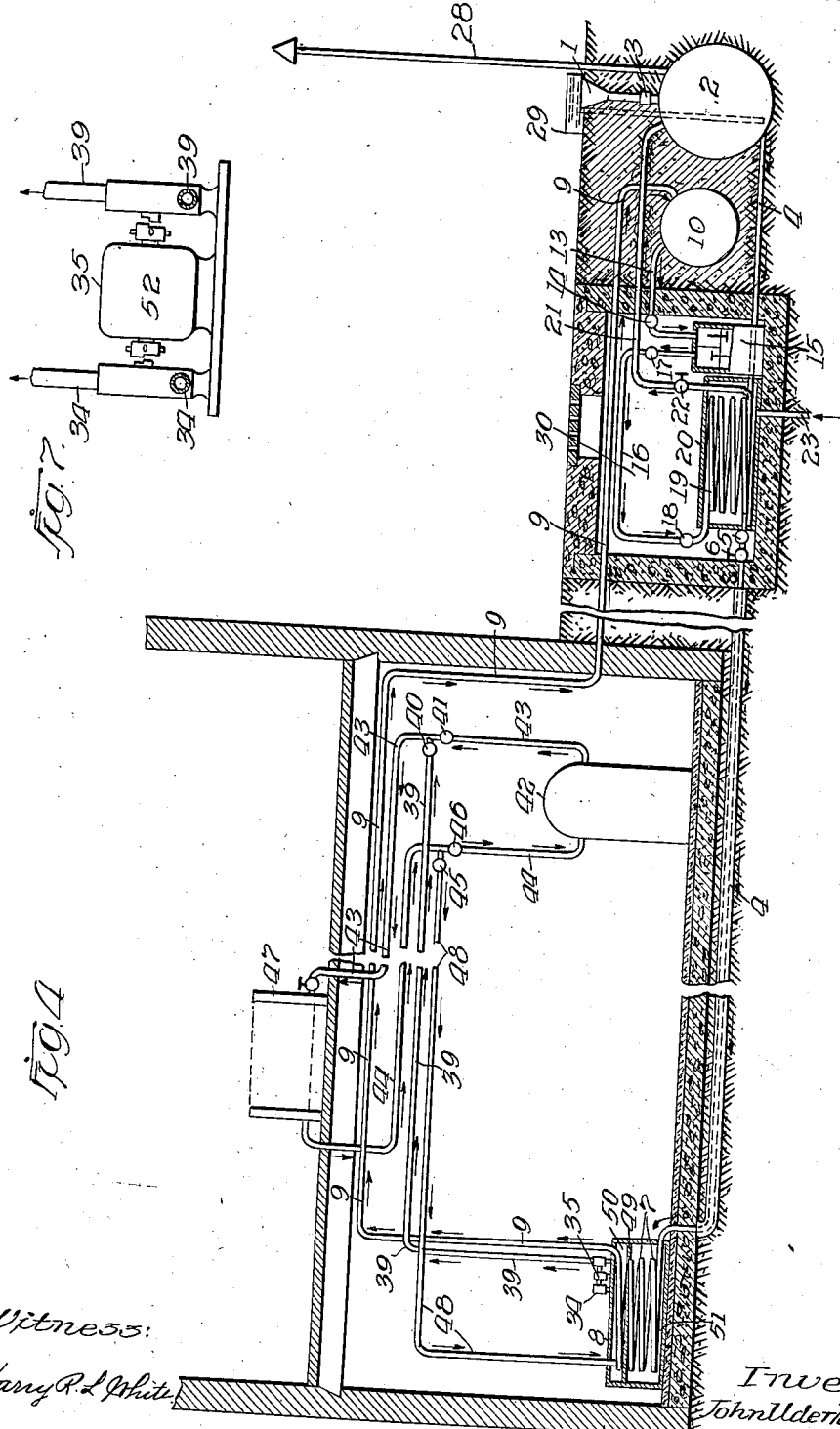

Nov. 30, 1937.　　　　J. U. FISH　　　　2,100,474
COMBINED AIR CONDITIONING AND HOUSE HEATING SYSTEM
Filed Oct. 4, 1935　　　　5 Sheets-Sheet 5
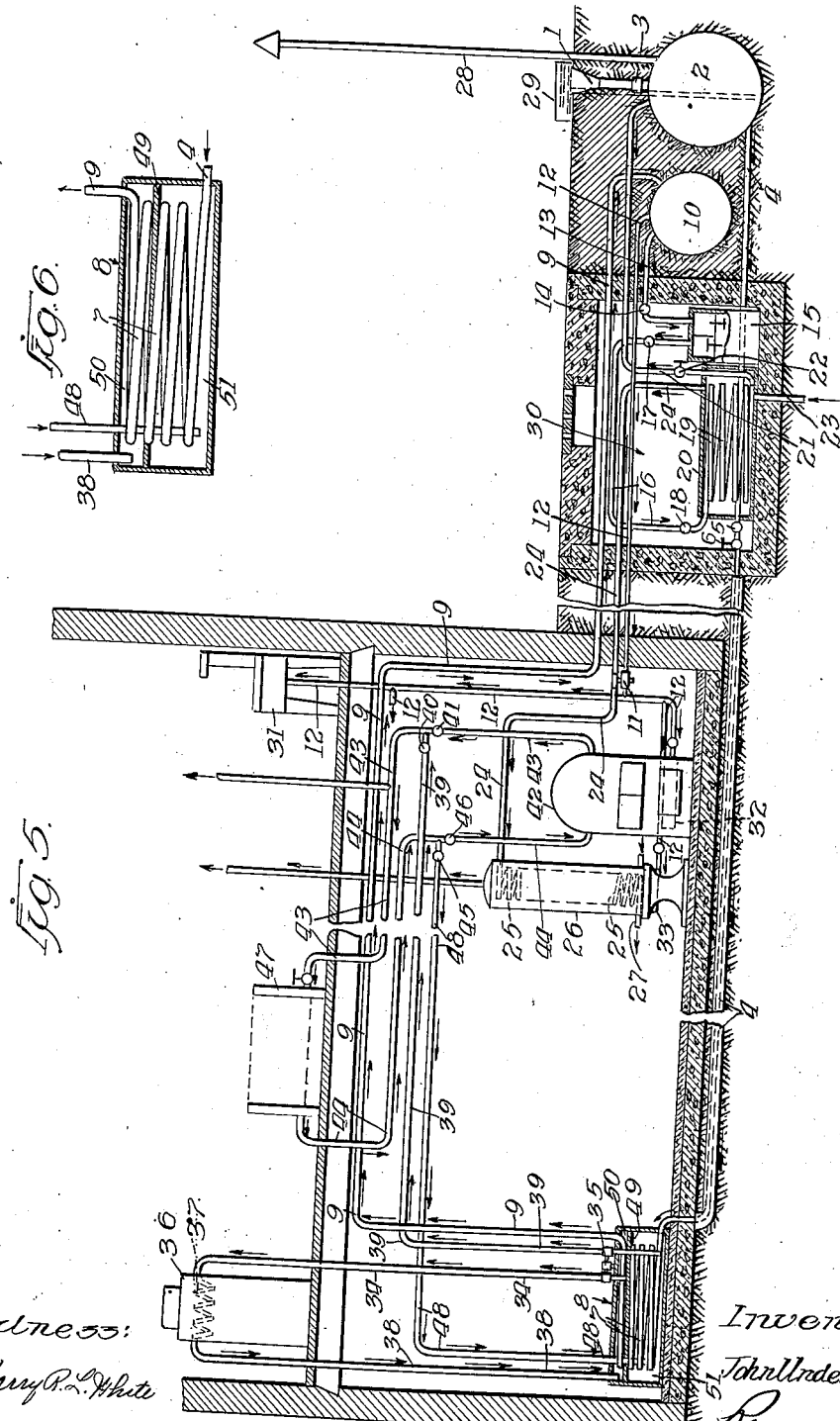

Patented Nov. 30, 1937

2,100,474

UNITED STATES PATENT OFFICE 2,100,474

COMBINED AIR CONDITIONING AND HOUSE HEATING SYSTEM

John Underhill Fish, Oak Park, Ill., assignor, by mesne assignments, to J. U. Fish Trust, composed of Elizabeth M. Fish, Paul L. Miller, and Eustace J. Knight, trustees Application October 4, 1935, Serial No. 43,639

3 Claims. (Cl. 62—115)

This invention relates to a new and improved method and means of utilizing the heating and refrigerating characteristics of propane and the like.

The main objects of this invention are to provide, in one unit, improved means for meeting the seasonal changes; to provide a system adapted to continuously supply fuel gas; to provide a system adapted to utilize the heating and cooling effects incident to pressure variation and consequent volumetric changes in propane; to provide a system to operate substantially all of the usual heating and cooling devices found in domestic service; to provide a system substantially devoid of fire and explosion hazards; to provide a system simple in construction and operation and adaptable to devices now in common use; and to provide a single unit system for air conditioning, heating and refrigerating service at a minimum cost.

These and other objects are attained in the progression of liquid propane from fluid state to the gaseous state expansion and contraction of the gas under changing pressure and the utilization of the latent heat absorbed through expansion and released through compression; and the ultimate combustion of the gas.

The novelty of my invention resides in the usage of a liquefied petroleum gas; first, for reusage of a liquefied petroleum gas; first, for refrigeration and air conditioning through the absorption of heat; and second, the combustion of the gas created through evaporation and expansion of the liquid, for general heating purposes; and third, the recompression of the excess gas so released so as to utilize for secondary heating purposes the latent heat so released.

For purposes of illustration, propane, one of the numerous liquefiable petroleum gases of the methane group, is used. It will be readily understood that any other petroleum gas having the necessary characteristics can be used. Propane has a boiling point of minus 45 degrees Fahrenheit and in condensing from a gas delivers substantially 780 B. t. u.'s of latent heat to the gallon. Hence it is readily adaptable for the purposes described.

An illustrative embodiment of my invention is shown in the accompanying drawings, in which:

Figure 1 is a diagrammatic view showing all of the gas producing units in connected relation.

Fig. 2 is a cross sectional view showing a system in which propane gas is used as a fuel.

Fig. 3 is a cross sectional view showing a system in which propane gas is used as a refrigerant.

Fig. 4 is a cross sectional view showing a system in which propane gas is used in connection with air conditioning.

Fig. 5 is a cross sectional view showing a system which is a combination of the systems shown in Figs. 2, 3, and 4.

Fig. 6 is a cross sectional view of the cooling tank.

Fig. 7 is an elevational view of the thermostatically controlled circulating pump.

Referring to Figure 1, propane, in liquid form, is inducted through an inlet pipe 1 from a movable carrier, not shown, into a liquid storage tank 2. A check valve 3 is provided in the inlet pipe 1 to prevent the escape of the propane gas from the tank 2.

The liquid propane is educted from the bottom of the tank through a welded, sealed pipe 4, through a check valve 5 and an expansion valve 6, into a coil 7 set in a cooling tank 8, containing either circulating air, water, alcohol, light oil or other suitable heat absorbing circulatable medium. The expansion valve 6 produces a pressure differential causing gasification at temperatures above minus 45 degrees Fahrenheit and there follows the absorption of 780 B. t. u.'s per gallon in the process of expansion. Therefore cold propane gas passes into the coil 7.

After circulating through the cooling tank 8, the gas from the coil 7 flows through a pipe 9 to a gas storage tank 10. From the gas storage tank, the gas passes through a pressure regulating control valve 11 to one or more outlet pipes, taking the form of a gas main 12, which may be connected to gas stoves 31 (see Fig. 2) or the like for cooking, etc., and used as a fuel.

Such excess of gas as through expansion may be released to the gas storage tank is conveyed through a pipe 13, passing through a control valve 14 to a compressor pump 15 which compresses the gas to a liquefied form. The liquid propane then passes by way of the pipe 16, through a check valve 17 and an oil recovery valve 18 through a continuation of the pipe 16 formed in a coil 19 which is enclosed in a cooling tank 20, containing water, and which is designed to absorb the released heat. The liquid propane then flows through pipe 21, a control valve 22 and back to its original source, the liquid storage tank 2.

The air, water, alcohol or other suitable heat absorbing and circulating medium surrounding the coil 7 in the cooling tank 8 enters the tank through pipes 38 and 48, and is withdrawn through pipes 34 and 39. The thermostatically controlled pump 35 forces the medium through radiators 47, as shown in Figure 4 through pipe 39, the valves 46 and 40 being closed during this operation, and to the refrigerator 36, as shown in Figure 3, through pipe 34.

The medium is then conveyed through return pipes 38 and 48, refrigerator return pipe and radiator return pipe, respectively, to the cooling tank 8 thereby forming a closed circulating system.

If air is used as a circulating medium, the air is discharged at the proper cooling point, the air being drawn into the cooling tank 8 and forced out through the pump 35.

In the tank 20, used for absorbing the released latent heat of the compressed gas, the water surrounding the coil 19 enters from an inlet pipe 23, suitably controlled, from the water main and passes through a pipe 24, see Fig. 5, through a coil 25 in a hot water tank 26, to a waste pipe 27, thus producing domestic hot water.

A safety vent pipe 28 and a depth indicating gauge 29 are attached to the tank 2 for obvious reasons.

Fig. 2 illustrates the method of using propane gas as a fuel. The gas is distributed from pipe 12 to burners in a domestic range 31, burners 32 in furnace 42, and burners 33 in the hot water boiler 26 to provide for house heating, cooking and water heating.

Fig. 3 illustrates one method of using propane gas as a means for refrigeration purposes in which the cold circulating medium is withdrawn from the upper section 50 of tank 8, through pipe 34 and caused to circulate by the thermostatically controlled pump 35 through cold coil 37 in refrigerator 36 and back to chamber 50 of tank 8 through pipe 38. Tank 8 is divided by a partition 49 to form two chambers 50 and 51.

Fig. 4 illustrates one method of using propane gas for air conditioning purposes in which cold circulating medium is withdrawn from the lower chamber 51 of tank 8, and is forced, by pump 35, through pipe 39 and cut-off valve 40 into pipe 43, and thence through the radiator 47 returning by way of pipe 44 through valve 45 in pipe 48 and thence to its place of beginning, lower chamber 51 of tank 8. The valves 41 and 46 are closed during this operation.

Fig. 5 shows the several units referred to in Figures 2, 3, and 4 combined as a complete system and further shows one manner in which the storage tank 2 and the gas tank 10 may be installed. The compression pump 15, heat absorbing tank 20 and expansion valve 6, are installed in a pit 30.

The pit 30, however, is arranged in such a manner that the parts installed therein are accessible for operating and repairing. A suitable above-ground housing however, may be utilized in lieu of the aforementioned pit 30 as may readily be understood.

In operation for seasonal use, the system referred to herein provides and accomplishes the following:

A twelve months' supply of propane gas for combustion purposes is provided through the gradual expansion of the liquid stored in tank 2, the resultant gas being stored in tank 10 and consumed as desired, at range burners 31 and hot water range burner 33, and also a supplemental supply of hot water conveyed from tank 20 created by the absorption of the latent heat released by the compression of the gas in compressor 15 and passing thence through coil 19. Such hot water is carried by pipe 24 from tank 20 through coil 25 in hot water tank 26 and thence by waste pipe 27 to the usual sewage main.

This system also provides for year around refrigeration, such refrigeration being supplied from chilled liquid from the upper chamber 50 of cooling tank 8 and conveyed by pipe 34 to cold coil 37 into refrigerator 36. The seasonal use of the air conditioning equipment for warm months, roughly May to October inclusive, is provided through timely attachment to any hot water, hot air or steam heating systems currently employed. A hot water system is disclosed in drawings for purposes of illustration, but it can readily be seen that the present system is readily adaptable to any heating plant. By closing the valves 41 and 46, and the opening of valves 40 and 45, the cooled circulating medium is caused to circulate by pump 35 through pipes 39, 43, 44, and 48, and pass through the radiator 47, thereby chilling them so that they throw off chilled air.

During the cold months of the year, roughly October to May, valves 41 and 46 are opened and valves 40 and 45 are closed, causing the normal circulation from boiler 42 through pipes 43 and 44 through radiation system 47, the boiler 42 of course being fired through burner 32 to which fuel gas is supplied through pipe 12.

In operation, the entire system is automatic except for the manipulation of the various valves which connect the radiators either with the boiler 42 or the cooling tank 8.

Although but one specific embodiment of this invention is herein shown and described, it is to be understood that the details as set forth may be altered or omitted without departing from the invention as defined by the following claims.

I claim:

1. In a device of the class described, a reservoir containing liquid propane, a reservoir containing propane gas, a pair of tanks each communicating with one of said reservoirs, coils in each of said tanks, a medium in each of said tanks surrounding said coils, one of said tanks having said medium sealed therein and communicating with said liquid reservoir, means located between said last-mentioned tank and reservoir adapted to expand said liquid propane and force it through said coil in said last-mentioned tank to absorb the heat of said medium to provide the latent heat necessary for changing the state of the liquid propane to a gas, means for forcing said gas so produced to said gas reservoir, means located between said gas reservoir and the other of said tanks adapted to compress said gas and force it through said tank, the medium in said tank being adapted to absorb the latent heat produced by the change of state of the propane, said liquid propane being adapted to pass from said coil to said liquid reservoir for reuse, and means for utilizing the medium in both of said tanks for heating, refrigerating and air-conditioning purposes.

2. In a device of the class described, a reservoir containing liquid propane, a reservoir containing propane gas, a pair of tanks each communicating with one of said reservoirs, coils in each of said tanks, a medium in each of said tanks surrounding said coils, one of said tanks having said medium sealed therein and communicating with said liquid reservoir, means located between said last-mentioned tank and reservoir adapted to expand said liquid propane and force it through said coil in said last-mentioned tank to absorb the heat of said medium to provide the latent heat necessary for changing the state of the liquid propane to a gas, means for forcing said gas so produced to said gas reservoir, means located between said gas reservoir and the other of said tanks adapted to compress said gas and force it through said tank, the medium in said tank being adapted to absorb the latent heat produced by the change of state of the propane, said liquid propane being adapted to pass from said coil to said liquid reservoir for reuse, means for utilizing a quantity of said gas in said gas reservoir for fuel combustion purposes, and means for utilizing the medium in both of said tanks for heating, refrigerating and air-conditioning purposes.

3. In a device of the class described, a reservoir containing liquid propane, a reservoir containing propane gas, a pair of tanks each communicating with one of said reservoirs, coils in each of said tanks, a medium in each of said tanks surrounding said coils, one of said tanks being divided into two chambers and having said medium sealed therein and communicating with said liquid reservoir, means located between said last-mentioned tank and reservoir adapted to expand said liquid propane and force it through said coil in said last-mentioned tank to absorb the heat of said medium to provide the latent heat necessary for changing the state of the liquid propane to a gas, means for forcing said gas so produced to said gas reservoir, means located between said gas reservoir and the other of said tanks adapted to compress said gas and force it through said tank, the medium in said tank being adapted to absorb the latent heat produced by the change of state of the propane, said liquid propane being adapted to pass from said coil to said liquid reservoir for reuse, means for utilizing a quantity of said gas in said gas reservoir for fuel combustion purposes, means for utilizing said medium in the upper half of said chamber of said first-mentioned tank for refrigeration purposes and the medium in the lower half of said tank for air-conditioning purposes, and means for utilizing said medium in the other of said tanks for heating purposes.

JOHN UNDERHILL FISH.